Sept. 29, 1964 R. H. BIRNEY 3,150,869
TORSION BAR SUSPENSION FOR MOTOR VEHICLES
Filed Oct. 23, 1963 3 Sheets-Sheet 3

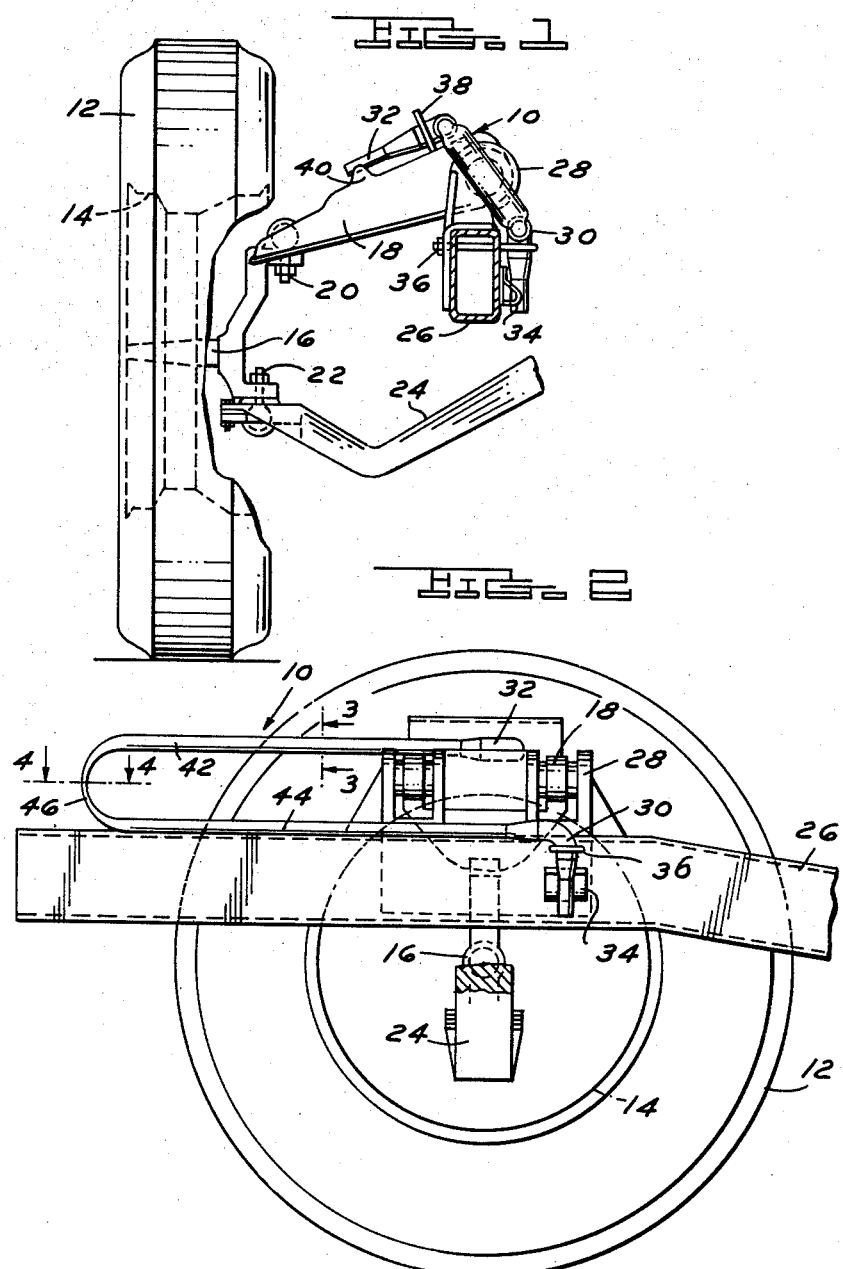

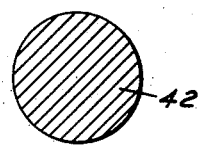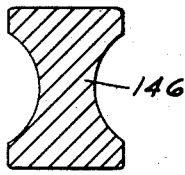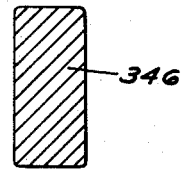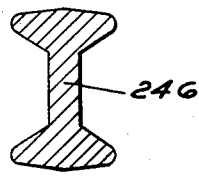

ROBERT H. BIRNEY
INVENTOR.
BY John R. Faulkner
Clifford L. Sadler
ATTORNEYS

United States Patent Office 3,150,869
Patented Sept. 29, 1964

3,150,869
TORSION BAR SUSPENSION FOR MOTOR
VEHICLES
Robert H. Birney, Birmingham, Mich., assignor to Ford Motor Company, Dearborn, Mich., a corporation of Delaware
Filed Oct. 23, 1963, Ser. No. 318,289
8 Claims. (Cl. 267—57)

The present invention relates to torsion bar suspension systems for motor vehicles and more particularly to the construction of a U-shaped torsion bar.

The use of torsion bars in motor vehicles to resiliently support the vehicle chassis upon the wheel assemblies has been known for some time. While a torsion bar suspension has many advantages, it has one disadvantage in that the bar is usually of awkward dimension for installation within the confined area in the region of the vehicle wheels and suspension components. In order to improve the adaptability of torsion bars to vehicle suspensions, it has been suggested to form the bar in the general shape of a hairpin and interpose the ends between a frame member and a suspension arm.

The present invention relates to a preferred construction for such a torsion bar. A hairpin or U-shaped torsion bar is torsionally loaded througout the length of its leg portions. The U-shaped bend that integrally connects the two legs is loaded in bending. While a circular cross section is highly efficient for carrying the stresses imposed by torsional loads, a circular cross section at the major bend does not employ the material from which the spring is formed in the most efficient manner.

Therefore, it is an object of the present invention to provide a torsion bar design having a U-shape form with a cross sectional configuration throughout its length that is best adapted to carry the stresses imposed upon it.

In one specific embodiment, a torsion bar constructed according to this invention has a circular cross section along the legs of the U-shaped bar with an elliptical cross section at the major bend which joins the two legs.

The many advantages of the present invention will be amply apparent from the following description when considered in connection with the accompanying drawings in which:

FIGURE 1 is a front elevational view of a vehicle suspension incorporating the present invention;

FIGURE 2 is a side elevational view;

FIGURE 3 is a sectional view taken along section lines 3—3 of FIGURE 2;

FIGURE 4 is a sectional view taken along section lines 4—4 of FIGURE 2;

FIGURES 5, 6 and 7 are alternate constructions of the invention corresponding to the sectional view of FIGURE 4;

Figure 8:
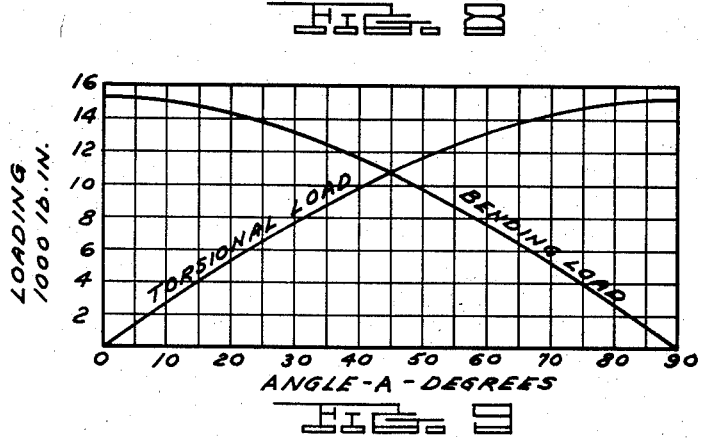
FIGURE 8 is a graph showing the bending and torsional loads carried by the bent portion of the torsion bar.

Referring now to the drawing for a better understanding of the invention, FIGURE 1 discloses an independent vehicle suspension system having a U-shaped torsion bar 10.

The suspension system of FIGURE 1 includes a tire 12 that is mounted on a wheel 14. The wheel and tire combination are rotatably supported on the spindle portion of a steering knuckle 16. The upper end of the knuckle 16 is connected to an upper suspension arm 18 by a ball joint assembly 20. A ball joint 22 connects the lower end of the knuckle 16 with a lower arm 24. The inner end of the lower arm 24 is pivotally mounted upon a chassis frame member (not shown).

A frame side rail 26 having a box section supports an upstanding bracket 28. The upper arm 18 is pivotally connected to the bracket 28.

The articulated connections between the inner ends of suspension arms 18, 24 and the vehicle frame and between the outer ends of the arms and the steering knuckle 16 permit the wheel and tire assembly 12, 14 to traverse a jounce and rebound path relative to the vehicle chassis with which the suspension of FIGURE 1 is associated.

The U-shaped torsion bar 10 has bent ends 30 and 32. The inner bent end 30 is secured by a U-bolt 36 to a notched bracket 34 that is welded to the frame 26. The outer or upper bent end 32 passes through a hole in a flange plate 38 that has been welded to the upper arm 18. Due to the torsional preload in the bar 10 provided by tightening the bolt 36, the bent end 32 is held in position by its engagement with a ridge 40 formed in the upper arm 18. The bent ends 30, 32 function as lever arms to load the bar 10 in torsion upon angular displacement of suspension arm 18 relative to the frame 26.

When the wheel and tire 12, 14 traverse a jounce and rebound path, the leg portions 42, 44 of the bar 10 will be stressed in pure torsion as a result of the angular movement of its upper end 32 relative to its lower end 30. The U-shaped interconnecting portion 46 will carry a pure bending load at its midpoint. The portions of the bent end 46 between its midpoint and the leg portion 42 or 44 will be loaded in both bending and torsion.

Figure 10:
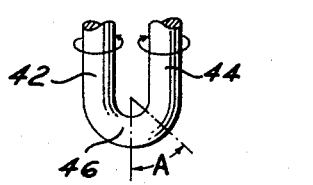
FIGURE 10 is a diagrammatic representation of the bar disclosed in FIGURES 8 and 9.

FIGURE 8 illustrates graphically the relative amounts of bending load and torsional load carried by different portions of the end portion 46. The horizontal axis of the graph is measured in degrees from the center of the bar is illustrated in FIGURE 10. Thus, when angle A is 90°, the bending load is zero and the torsional load is at its maximum. The converse is true when angle A is zero. The curves for the bending load and the torsional load meet at the 45° point.

Figure 9:
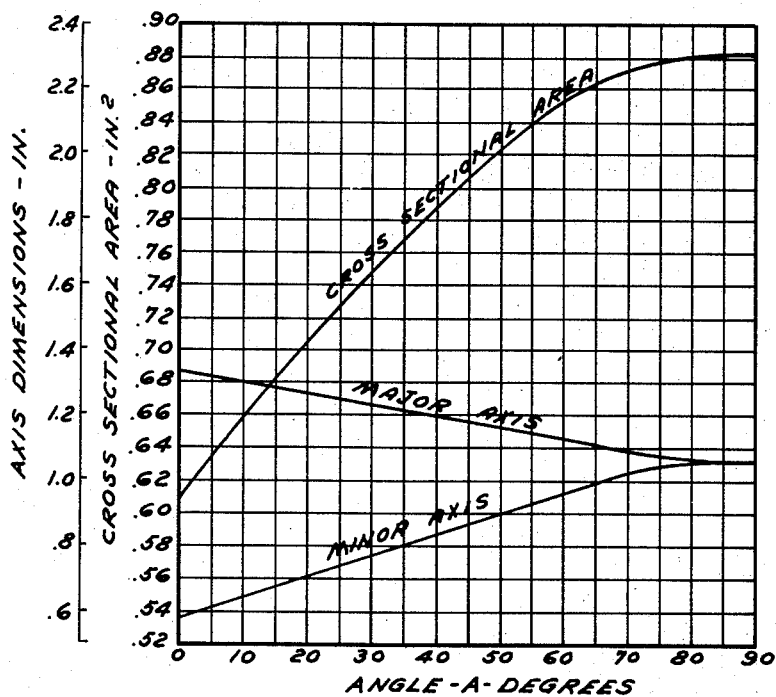
FIGURE 9 is a graph showing the comparative dimensions of the major and minor axes of the torsion bar at the major bend together with the cross sectional view of the area.

While a circular cross section for the leg portions 42 and 44 is highly efficient for carrying the torsional loads, a circular cross section at the midpoint end 46 (angle A equals zero) is not the most efficient design for handling bending loads. In accordance with the present invention, a torsion bar is provided having an elliptical cross section (see FIGURE 4) where angle A equals zero. The ellipse of FIGURE 4 blends with a gradual taper into a circular cross section (see FIGURE 3) where angle A equals 90°. At the angle A equals zero portion of the bend 46, the ellipse of FIGURE 4 has a major axis that is perpendicular to the plane containing the leg portions 42, 44. This design effectively and efficiently handles the pure bending loads at the midpoint of the bend 46 and the combination of bending in torsion loads that appear in the other points along portion 46. The graph of FIGURE 9 discloses the relative size of the major and minor axes of the ellipses from the midpoint to the point where the axes are of equal length (circular cross section) at angle A equals 90°.

This graph also illustrates the change in cross sectional area. The area curve demonstrates the efficient manner in which the metal of the torsion bar is utilized.

FIGURES 5, 6 and 7 illustrate alternate embodiments of the invention. These figures correspond to the cross section of a torsion bar at the midpoint and are also characterized by their efficient handling of the bending moments. FIGURES 5 and 7 disclose modified I sections 146, 246 and FIGURE 6 discloses a rectangular section 346. The particular configuration best suited for a particular application depends upon the specifications of the bar, such as the radius of the bend and the diameter of the leg portions.

The foregoing description presents the presently preferred embodiments of the invention. Alterations and modifications may occur to those skilled in the art that will come wtihin the scope and spirit of the following claims:

I claim:

1. A vehicle suspension system having sprung and unsprung parts, a torsion bar interposed between said parts, the ends of said bar being secured to the sprung and unsprung components respectively so that said bar is stressed when the unsprung components traverse a jounce and rebound path, said bar having a generally U-shape and comprising a pair of leg portions and an integral U-shaped portion connecting said leg portions, said leg portions having a circular cross section, the midportion of said U-shaped portion having an elliptical cross section with its major axis perpendicular to a plane containing the said leg portions, the configuration of the bar at the integral U-shaped portion blending smoothly from the circular cross section where it is joined with the legs to the elliptical cross section at its midpoint.

2. A vehicle suspension system having sprung and unsprung parts, a torsion bar interposed between said parts, the ends of said bar being secured to the sprung and unsprung components respectively so that said bar is stressed when the unsprung components traverse a jounce and rebound path, said bar having a generally U-shape and comprising a pair of leg portions and an integral U-shaped portion connecting said leg portions, said leg portions having a circular cross section, the midportion of said U-shaped portion having an elliptical cross section with its major axis perpendicular to a plane containing the said leg portions and the dimension of said bar ellipse along its minor axis being less than the diameter of said circular cross section, the configuration of the bar at the integral U-shaped portion blending smoothly from the circular cross section where it is joined with the legs to the elliptical cross section at its midpoint.

3. A vehicle suspension system having sprung and unsprung parts, a torsion bar interposed between said parts, the ends of said bar being secured to the sprung and unsprung components respectively so that said bar is stressed when the unsprung components traverse a jounce and rebound path, said bar having a generally U-shape and comprising a pair of leg portions and an integral U-shaped portion connecting said leg portions, said leg portions having a circular cross section, the midportion of said U-shaped portion having an elliptical cross section with its major axis perpendicular to a plane containing the said leg portions, the dimension of said bar along said major axis being greater than the diameter of said circular cross section, the configuration of the bar at the integral U-shaped portion blending smoothly from the circular cross section where it is joined with the legs to the elliptical cross section at its midpoint.

4. A vehicle suspension system having sprung and unsprung parts, a torsion bar interposed between said parts, the ends of said bar being secured to the sprung and unsprung components respectively so that said bar is stressed when the unsprung components traverse a jounce and rebound path, said bar having a generally U-shape and comprising a pair of leg portions and an integral U-shaped portion connecting said leg portions, said leg portions having a circular cross section, the midportion of said U-shaped portion having an elliptical cross section with its major axis perpendicular to a plane containing the said leg portions, the dimension of said bar along said major axis being greater than the diameter of said circular cross section, and the dimension along the minor axis being less than said diameter, the configuration of the bar at the integral U-shaped portion blending smoothly from the circular cross section where it is joined with the legs to the elliptical cross section at its midpoint.

5. A vehicle suspension system having sprung and unsprung parts, a torsion bar interposed between said parts, the ends of said bar being secured to the sprung and unsprung components respectively so that said bar is stressed when the unsprung components traverse a jounce and rebound path, said bar having a generally U-shape and comprising a pair of leg portions and an integral U-shaped portion connecting said leg portions, said leg portions having a circular cross section, the midportion of said U-portion having a noncircular cross section with a major axis perpendicular to a plane containing the said leg portions and with a dimension along said major axis that is greater than the diameter of the circular cross section, the dimension of said midportion along a minor axis perpendicular to said major axis being less than said diameter, the configuration of the bar at the integral U-shaped portion blending smoothly from the circular cross section where it is joined with the legs to the noncircular cross section at its midpoint.

6. A vehicle suspension system having sprung and unsprung parts, a torsion bar interposed between said parts, the ends of said bar being secured to the sprung and unsprung components respectively so that said bar is stressed when the unsprung components traverse a jounce and rebound path, said bar having a generally U-shape and comprising a pair of leg portions and an integral U-shaped portion connecting said leg portions, said leg portions having a circular cross section, the midportion of said U-shaped portion having a generally I-shaped cross section with a major axis perpendicular to a plane containing the said leg portions and with a dimension along said major axis that is greater than the diameter of the circular cross section, the dimension of said midportion along a minor axis perpendicular to said major axis being less than said diameter, the configuration of the bar at the integral U-shaped portion blending smoothly from the circular cross section where it is joined with the legs to the noncircular cross section at its midpoint.

7. A vehicle suspension system having sprung and unsprung parts, a torsion bar interposed between said parts, the ends of said bar being secured to the sprung and unsprung components respectively so that said bar is stressed when the unsprung components traverse a jounce and rebound path, said bar having a generally U-shape and comprising a pair of leg portions and an integral U-shaped portion connecting said leg portions, said leg portions having a circular cross section, the midportion of said U-shaped portion having a generally I-shaped cross section with a major axis perpendicular to a plane containing the said leg portions, the configuration of the bar at the integral U-shaped portion blending smoothly from the circular cross section where it is joined with the legs to the noncircular cross section at its midpoint.

8. A vehicle suspension system having sprung and unsprung parts, a torsion bar interposed between said parts, the ends of said bar being secured to the sprung and unsprung components respectively so that said bar is stressed when the unsprung components traverse a jounce and rebound path, said bar having a generally U-shape and comprising a pair of leg portions and an integral U-shaped portion connecting said leg portions, the midportion of said U-shaped portion having an elliptical cross section with its major axis perpendicular to a plane containing the said leg portions.

References Cited in the file of this patent

UNITED STATES PATENTS

| | | |
|---|---|---|
| 2,794,632 | Schilberg | June 4, 1957 |
| 2,858,142 | Schjolin | Oct. 28, 1958 |
| 3,029,091 | Allison | Apr. 10, 1962 |